United States Patent
Hirai et al.

(10) Patent No.: US 11,870,379 B2
(45) Date of Patent: Jan. 9, 2024

(54) CONTROL DEVICE FOR ROTATING ELECTRICAL MACHINE

(71) Applicant: DENSO CORPORATION, Kariya (JP)

(72) Inventors: Tarou Hirai, Kariya (JP); Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/861,789

(22) Filed: Jul. 11, 2022

(65) Prior Publication Data

US 2022/0345065 A1 Oct. 27, 2022

Related U.S. Application Data

(63) Continuation of application No. PCT/JP2021/000242, filed on Jan. 6, 2021.

(30) Foreign Application Priority Data

Jan. 10, 2020 (JP) .................................. 2020-003070
Oct. 12, 2020 (JP) .................................. 2020-171857

(51) Int. Cl.
*H02P 27/06* (2006.01)
*B60L 3/00* (2019.01)
(Continued)

(52) U.S. Cl.
CPC ............ *H02P 27/06* (2013.01); *B60L 3/0061* (2013.01); *B60L 15/20* (2013.01); *H02P 29/024* (2013.01)

(58) Field of Classification Search
CPC ...... H02P 27/06; H02P 29/024; B60L 3/0061; B60L 15/20
See application file for complete search history.

(56) References Cited

U.S. PATENT DOCUMENTS

2008/0215214 A1* 9/2008 Matsubara ........... B60W 10/115
477/34
2015/0025728 A1* 1/2015 Hase ..................... B60W 20/10
701/22

(Continued)

FOREIGN PATENT DOCUMENTS

| JP | 2016-147585 | A |   | 8/2016 |
| JP | 2016147585  | A | * | 8/2016 |
| JP | 2020-14314  | A |   | 1/2020 |

*Primary Examiner* — Kawing Chan
(74) *Attorney, Agent, or Firm* — Oliff PLC

(57) ABSTRACT

The control device includes a target-value calculation unit calculating a target-value of a controlled variable that is torque of a rotating electrical machine, drive force, or acceleration of a vehicle, based on redundant signal and non-redundant signals, an inverter operation unit operating the inverter to control the controlled variable to the target-value, and a monitoring-value calculation unit calculating a target-monitoring-value of the controlled variable based on the redundant signal. A difference calculation unit that, when the vehicle travels forward, calculates a difference between the target-value and the target-monitoring-value when the target-value is a first determination value or more, and does not calculate the difference when the target-value is less than the first determination value, and that, when the vehicle travels rearward, calculates the difference when the target-value is a second determination value or less, and does not calculate the difference when the target-value is more than the second determination value.

12 Claims, 11 Drawing Sheets

(51) Int. Cl.
  *B60L 15/20* (2006.01)
  *H02P 29/024* (2016.01)

(56) References Cited

U.S. PATENT DOCUMENTS

| | | | |
|---|---|---|---|
| 2016/0138494 A1* | 5/2016 | Arikai | B60W 50/0205 |
| | | | 701/102 |
| 2018/0013369 A1* | 1/2018 | Fujii | H02P 25/022 |
| 2018/0023639 A1* | 1/2018 | Hattori | B60K 6/387 |
| | | | 701/68 |

* cited by examiner

<WHEN ACCELERATOR IS OFF>

<WHEN ACCELERATOR IS ON>

<TRAVEL FORWARD>

<TRAVEL BACKWARD>

CONTROL DEVICE FOR ROTATING ELECTRICAL MACHINE

CROSS-REFERENCE TO RELATED APPLICATION

The present application is based on and claims the benefit of priority from earlier Japanese Patent Applications No. 2020-003070 filed on Jan. 10, 2020 and No. 2020-171857 filed on Oct. 12, 2020, the descriptions of which are incorporated herein by reference.

BACKGROUND

Technical Field

The present disclosure relates to a control device for a rotating electrical machine that performs drive control of the rotating electrical machine serving as a traveling power source of a vehicle.

Related Art

An electronic control device is known which includes a microcontroller controlling an actuator and a microcontroller monitoring unit that monitors occurrence of an abnormality in the microcontroller. When an abnormality has occurred in the microcontroller, the control device performs a fail-safe for the actuator.

SUMMARY

As an aspect of the present disclosure, a control device for a rotating electrical machine is provided. The control device is applied to a vehicle including the rotating electrical machine capable of transmitting power to a drive wheel and an inverter electrically connected to the rotating electrical machine. The control device includes:
  a target value calculation unit that calculates a target value of a controlled variable that is torque of the rotating electrical machine, drive force of the rotating electrical machine, or acceleration of the vehicle, based on a redundant signal and a non-redundant signal;
  an inverter operation unit that operates the inverter to control the controlled variable to the target value;
  a monitoring value calculation unit that calculates a target monitoring value of the controlled variable based on the redundant signal; and
  a difference calculation unit that, when the vehicle travels forward, calculates a difference between the target value and the target monitoring value when the target value is a first determination value or more, and does not calculate the difference when the target value is less than the first determination value, and that, when the vehicle travels rearward, calculates the difference when the target value is a second determination value or less, and does not calculate the difference when the target value is more than the second determination value.

BRIEF DESCRIPTION OF THE DRAWINGS

In the accompanying drawings.

DETAILED DESCRIPTION OF THE PREFERRED EMBODIMENTS

As described in JP 2016-147585 A, an electronic control device is known which includes a microcontroller controlling an actuator and a microcontroller monitoring unit that monitors occurrence of an abnormality in the microcontroller. When an abnormality has occurred in the microcontroller, the control device performs a fail-safe for the actuator.

A known control device is applied to a vehicle including a rotating electrical machine that can transmit power to drive wheels and an inverter electrically connected to the electronic control device. The control device uses torque of the rotating electrical machine, drive force of the rotating electrical machine, or acceleration of the vehicle as a controlled variable to calculate a target value of the controlled variable. The control device operates the inverter to control the controlled variable to the calculated target value.

It is concerned that the vehicle may accelerate without intention of the driver due to occurrence of an abnormality in the control device. To prevent the occurrence of such a situation, the control device calculates a target value based on a redundant signal and a non-redundant signal and calculates a target monitoring value of the controlled variable based on the redundant signal. If the difference between the target value and the target monitoring value is a threshold value or more in the traveling direction of the vehicle, the control device determines that an abnormality has occurred in the control device and performs an abnormal case process such as a fail-safe process for the rotating electrical machine.

However, even is a case in which no abnormality has occurred in the control device, the target value may be largely displaced from the target monitoring value. In this case, although the abnormal case process should not be performed, the abnormal case process is performed, whereby it is concerned that drivability of the vehicle lowers.

An object of the present disclosure is to provide a control device for a rotating electrical machine which can appropriately detect occurrence of an abnormality in the control device while suppressing occurrence of a situation in which an abnormal case process is performed though the abnormal case process should not be performed.

First Embodiment

Hereinafter, the first embodiment embodying a control device according to the present disclosure will be described with reference to the drawings. The control device of the present embodiment is installed in a vehicle such as a hybrid automobile, an electrical automobile, or the like, which uses a rotating electrical machine as a traveling power source.

Figure 1:
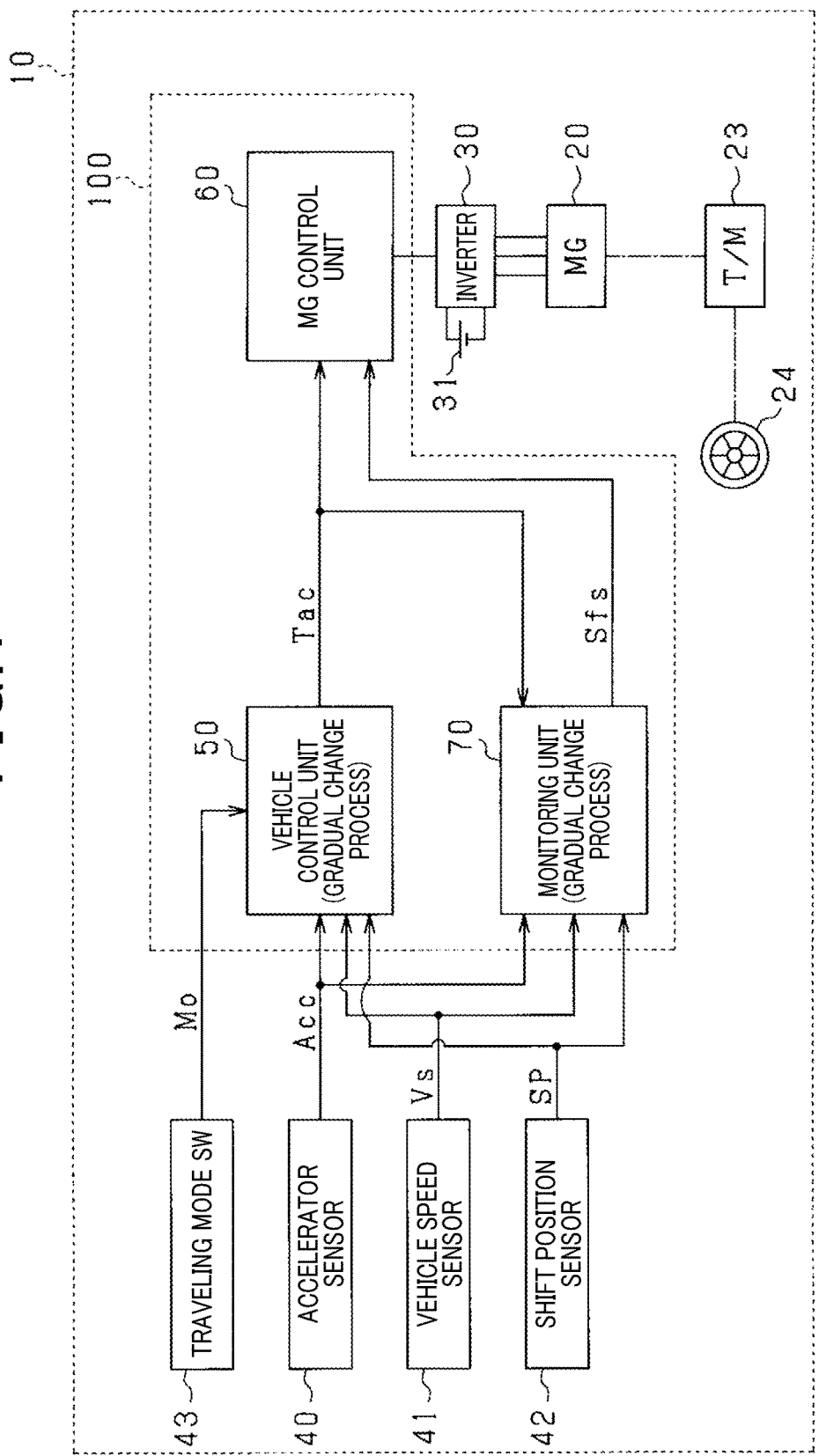
FIG. 1 is a diagram illustrating an overall configuration of an in-vehicle system according to a first embodiment.

As illustrated in FIG. 1, a vehicle 10 includes a rotating electrical machine 20, an inverter 30, and a storage battery 31 serving as an electrical storage device. In the present embodiment, the rotating electrical machine 20 has a three-phase stator winding and a rotor, and is, for example, a permanent magnet type synchronous machine.

The vehicle 10 has a transmission 23 and drive wheels 24. The rotor of the rotating electrical machine 20 can transmit power to the drive wheels 24 via the transmission 23. That is, the rotating electrical machine 20 serves as a traveling power source of the vehicle 10.

The stator winding of the rotating electrical machine 20 is electrically connected to the storage battery 31 via the inverter 30. The inverter 30 has switches of an upper arm and a lower arm. The storage battery 31 is an assembled battery including a serial connection of a plurality of cells and is a secondary battery such as a lithium-ion storage battery or a nickel-hydrogen storage battery.

The vehicle 10 includes an accelerator sensor 40, a vehicle speed sensor 41, a shift position sensor 42, and a traveling mode switch 43. The accelerator sensor 40 detects an accelerator manipulated variable Acc, which is a depressed amount of an accelerator pedal serving as an accelerator operating member for a driver. The vehicle speed sensor 41 detects a vehicle speed Vs, which is a traveling speed of the vehicle 10.

The shift position sensor 42 detects a shift position SP, which is a position of a shift lever of the transmission 23 operated by the driver. The shift position SP of the present embodiment includes a parking range (P range) used when the vehicle 10 is parked, a reverse range (R range) instructing the vehicle 10 to travel backward, a neutral range (N range) at which power transmission between the rotor and the drive wheel 24 is interrupted, and a drive range (D range) instructing the vehicle 10 to travel forward.

The traveling mode switch 43 is for setting torque output characteristics of the rotating electrical machine 20 and is operated by the driver. The traveling mode switch 43 is operated to set a traveling mode of the vehicle 10. In the present embodiment, the traveling mode includes an eco mode, a normal mode, a sport mode, and a power mode. The eco mode gives high priority to energy efficiency of the vehicle 10, that is, electricity consumption rather than output. The sport mode gives high priority to travelling performance of the vehicle 10, that is, output rather than electricity consumption. The normal mode is intermediate between the eco mode and the sport mode.

Output signals of the sensors 40 to 42 and a traveling mode signal Mo indicating an operating state of the traveling mode switch 43 are transmitted to a control device 100 included in the vehicle 10. The control device 100 includes a vehicle control unit 50, an MG control unit 60, and a monitoring unit 70.

Figure 2:
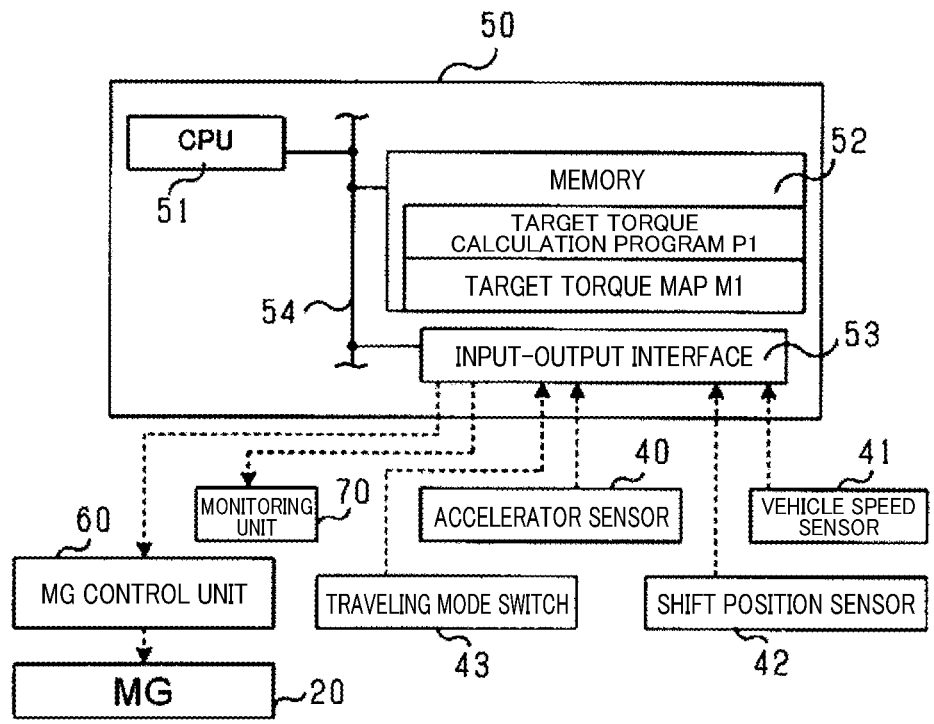
FIG. 2 is a functional block diagram illustrating a process of a vehicle control unit.

As illustrated in FIG. 1 and FIG. 2, the vehicle control unit 50 receives the accelerator manipulated variable Acc and the vehicle speed Vs, which are redundant signals, and the traveling mode signal Mo, which is a non-redundant signal. The vehicle control unit 50 also receives an output signal of the shift position sensor 42.

In contrast, the monitoring unit 70 receives the accelerator manipulated variable Acc and the vehicle speed Vs, which are redundant signals, and does not receive the traveling mode signal Mo, which is a non-redundant signal. The monitoring unit 70 also receives an output signal of the shift position sensor 42.

For example, in a case of the vehicle control unit 50, the redundant signal is input to the vehicle control unit 50 from a redundant sensor or is input to the vehicle control unit 50 from a sensor through a redundant signal line. The non-redundant signal is input to the vehicle control unit 50 from a non-redundant sensor or is input to the vehicle control unit 50 from a sensor through a single signal line.

In the present embodiment, the redundancy of the sensor is achieved, for example, by a configuration in which a detection element configuring a sensor, a signal processing circuit, and an output unit are duplexed or a configuration in which a single detection element is used and a signal processing circuit and an output unit are duplexed. The redundancy of the signal line is achieved, for example, by a configuration in which a sensor and the vehicle control unit 50 are connected through two or more signal lines.

In the present embodiment, the non-redundant sensor includes a single detection element, a signal processing circuit, and an output unit. The non-redundancy of the signal line is, for example, an aspect in which a sensor and the vehicle control unit 50 are connected through a single signal line.

It is noted that the redundant signal may be defined as a signal having high reliability, and the non-redundant signal may be defined as a signal having reliability lower than that of the redundant signal.

The vehicle control unit 50 calculates target torque (corresponding to a target value) of the rotating electrical machine 20 at every predetermined control cycle based on the accelerator manipulated variable Acc, the vehicle speed Vs, and the traveling mode signal Mo. When the vehicle 10 is traveling forward, if the target torque becomes a positive value, the vehicle 10 is caused to accelerate in the travelling direction, whereas if the target torque becomes a negative value, the vehicle 10 is caused to decelerate. In contrast, when the vehicle 10 is traveling backward, if the target torque becomes a negative value, the vehicle 10 is caused to accelerate in the travelling direction, whereas if the target torque becomes a positive value, the vehicle 10 is caused to decelerate. The vehicle control unit 50 subjects the calculated target torque to a gradual change process and outputs the processed target torque. In the gradual change process, when the target torque changes, the target torque before change is gradually changed to the target torque after change. The gradual change process is for suppressing a sudden change in torque of the rotating electrical machine 20 for suppressing degradation in drivability. In the present embodiment, the vehicle control unit 50 corresponds to a target value calculation unit.

In the present embodiment, the gradual change process is a smoothing process or a rate process. A torque gradual change aspect at every control cycle by the smoothing process and a gradual change aspect at every control cycle by the rate process are different from each other. First, the smoothing process will be described.

If the calculated target torque is more than first predetermined torque (>0), or the calculated target torque is less than second predetermined torque (<0), the vehicle control unit 50 subjects the calculated target torque to the smoothing process. Specifically, when the target torque used for the torque control by the MG control unit 60 in the previous control cycle is T[n−1], the target torque before the smoothing process calculated in the current control cycle is T[n], and the degree of the smoothing is Ra, target torque Tac in the current control cycle that has been subjected to the smoothing process is expressed by the following expression (eq1). The degree Ra of the smoothing is a value more than 0 and less than 1, and is set to, for example, 0.5.

$$Tac = T[n-1] + (T[n-]-T[n-1])*Ra \quad (eq1)$$

The target torque Tac expressed by the above expression (eq1) is used for the torque control in the current control cycle.

Next, the rate process will be described. If the calculated target torque is in a predetermined torque range, which is the first predetermined torque or less and the second predetermined torque or more, the vehicle control unit 50 subjects the calculated target torque to the rate process. In the rate process, the target torque used for torque control in the previous control cycle is changed, by a predetermined amount of change, to the target torque before the rate process calculated in the current control cycle.

For example, when the target torque changes in a step-by-step manner, the amount of gradual change of the target torque in the smoothing process is initially large but gradually decreases at every control cycle, whereas the amount of gradual change of the target torque in the rate process is the constant predetermined amount of change at every control cycle. When the sign of torque of the rotating electrical machine 20 is changed, that is, when the torque of the rotating electrical machine 20 is within a predetermined torque range crossing 0, if the amount of change of the torque is large, a problem arises that drivability significantly lowers. To overcome this problem, it is confirmed that the amount of gradual change of the torque is preferably determined by the rate process, not by the smoothing process. Thus, when the target torque is within the predetermined torque range including 0, the target torque is subjected to the rate process.

The MG control unit 60 performs switching control of upper and lower arm switches of the inverter 30 to control torque of the rotating electrical machine 20 to the target torque Tac after the gradual change process output from the vehicle control unit 50. Specifically, the MG control unit 60 performs power running drive control or regenerative drive control. The power running drive control is switching control for converting DC power output from the storage battery 31 to AC power and supplying the AC power to the stator winding. When this control is performed, the rotating electrical machine 20 functions as a generator to generate power running torque. The regenerative drive control is switching control for converting AC power generated by the rotating electrical machine 20 to DC power and supplying the DC power to the storage battery 31. When this control is performed, the rotating electrical machine 20 functions as a generator to generate regenerative torque. The regenerative torque applies braking force to the wheels. In the present embodiment, the MG control unit 60 corresponds to an inverter operation unit.

When monitoring the vehicle control unit 50, the monitoring unit 70 calculates target monitoring torque (corresponding to a monitoring value) at every control cycle based on the accelerator manipulated variable Acc and the vehicle speed Vs. Then, the monitoring unit 70 subjects the calculated target monitoring torque to the gradual change process and outputs the processed target monitoring torque. In the present embodiment, the gradual change process performed by the monitoring unit 70 is a smoothing process or a rate process. The smoothing process and the rate process performed by the monitoring unit 70 are the same as the smoothing process and the rate process performed by vehicle control unit 50. The smoothing processes performed by the vehicle control unit 50 and the monitoring unit 70 are not necessarily the same. The rate processes performed by the vehicle control unit 50 and the monitoring unit 70 are not necessarily the same.

In response to a result of a comparison between the target torque Tac after the gradual change process output from the vehicle control unit 50 and a target monitoring torque Taw after the gradual change process, the monitoring unit 70 performs the abnormal case process for outputting a fail-safe signal Sfs, which indicates that an abnormality has occurred in the vehicle control unit 50, to the MG control unit 60. The fail-safe signal Sfs is a signal instructing the MG control unit 60 to lower output torque of the rotating electrical machine 20 to creep torque or a signal instructing the MG control unit 60 to lower output torque of the rotating electrical machine 20 to stop the rotating electrical machine 20. If determining that the fail-safe signal Sfs is received, the MG control unit 60 performs a process for lowering output torque of the rotating electrical machine 20 to creep torque or a process for lowering output torque of the rotating electrical machine 20 to 0. In the present embodiment, the monitoring unit 70 corresponds to a monitoring value calculation unit and a processing unit.

As illustrated in FIG. 2, the vehicle control unit 50 includes a central processing unit (CPU 51), a memory 52, an input-output interface 53, and a bus 54. The CPU 51, the memory 52, and the input-output interface 53 are connected via the bus 54 so that bidirectional communication can be performed. The memory 52 includes a non-volatile memory (e.g., a ROM) storing a target torque calculation program P1 for calculating the target torque Tac and a memory (e.g., a RAM), which is readable and writable by the CPU 51, and is other than a ROM.

The non-volatile memory configuring the memory 52 further stores a target torque map M1 used for calculating the target torque. The target torque map M1 is map information in which the target torque is provided which is associated with the traveling mode, the accelerator manipulated variable Acc, and the vehicle speed Vs. The CPU 51 loads the target torque calculation program P1 stored in the memory 52 into the readable and writable memory to execute the target torque calculation program P1 to calculate the target torque. The CPU 51 subjects the calculated target torque to the gradual change process.

The input-output interface 53 is connected with the accelerator sensor 40, the vehicle speed sensor 41, the shift position sensor 42, the traveling mode switch 43, the MG control unit 60, and the monitoring unit 70 respectively via signal lines. The input-output interface 53 receives detection signals from the accelerator sensor 40, the vehicle speed sensor 41, the shift position sensor 42, and the traveling mode switch 43. The input-output interface 53 receives redundant signals from the accelerator sensor 40, the vehicle speed sensor 41, and the shift position sensor 42, and receives a non-redundant signal from the traveling mode switch 43. That is, in the present embodiment, the accelerator sensor 40, the vehicle speed sensor 41, and the shift position sensor 42 are redundant sensors, and the traveling mode switch 43 is a non-redundant sensor.

Figure 3:
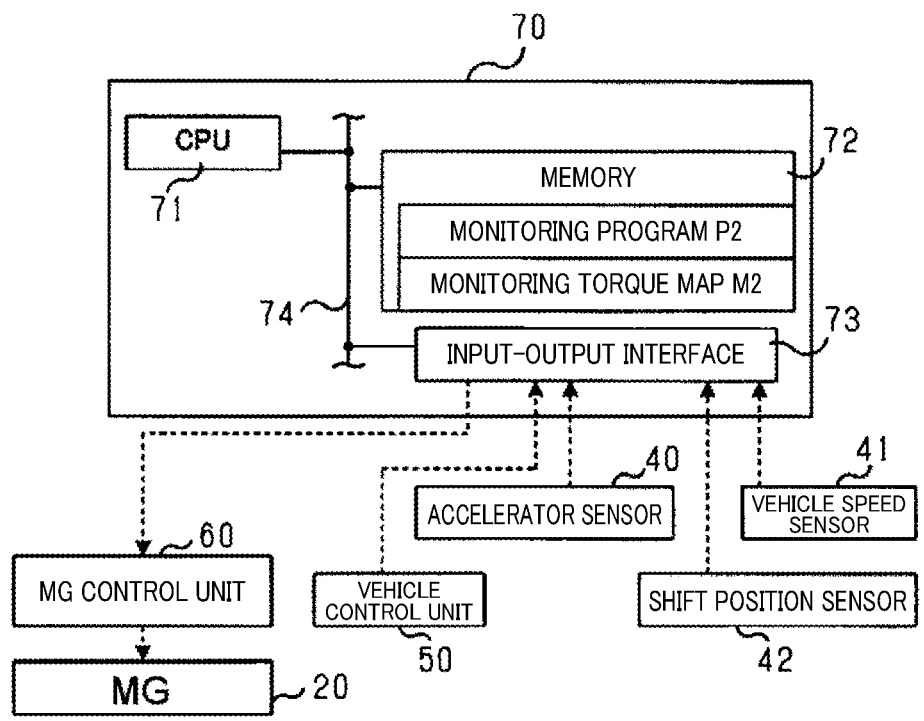
FIG. 3 is a functional block diagram illustrating a process of a monitoring unit.

As illustrated in FIG. 3, the monitoring unit 70 includes a CPU 71, a memory 72, an input-output interface 73, and a bus 74. The CPU 71, the memory 72, and the input-output interface 73 are connected via the bus 74 so that bidirectional communication can be performed. The memory 72 includes a non-volatile memory (e.g., a ROM) storing a monitoring program P2 for calculating the target monitoring torque and performing abnormality determination of the vehicle control unit 50 to determine whether to perform a fail-safe, and a memory (e.g., a RAM), which is readable and writable by the CPU 71, and is other than a ROM.

The non-volatile memory configuring the memory 72 further stores a monitoring torque map M2 used for calculating the target monitoring torque. The monitoring torque map M2 is map information in which the target monitoring torque Taw is provided which is associated with the accelerator manipulated variable Acc and the vehicle speed Vs. The monitoring torque map M2 is associated with a plurality of target torques that can be set depending on the traveling mode, that is, output characteristics in which the target torque is the largest among the characteristics of output torque of the rotating electrical machine 20.

The CPU 71 loads the monitoring program P2 stored in the memory 72 into the readable and writable memory to execute the monitoring program P2 to calculate the target monitoring torque. The CPU 71 subjects the calculated target monitoring torque to the gradual change process. The CPU 71 compares the target monitoring torque Taw that has been subjected to the gradual change process with the target torque Tac that has been subjected to the gradual change process to determine whether to perform a fail-safe.

The input-output interface 73 is connected with the accelerator sensor 40, the vehicle speed sensor 41, the shift position sensor 42, the vehicle control unit 50, and the MG control unit 60 respectively via signal lines. The input-output interface 73 receives detection signals from the accelerator sensor 40, the vehicle speed sensor 41, and the shift position sensor 42. The monitoring unit 70 receives no detection signals from the non-redundant traveling mode switch 43.

Next, with reference to FIG. 4, a target torque Tac calculation process performed by the CPU 51 of the vehicle control unit 50 will be described. This process is repeatedly performed at predetermined control cycles during a time period from the start of a control system of the vehicle 10 to the stop of the control system or a time period from the time when a start switch of the vehicle 10 is turned on to the time when the start switch is turned off.

In step S10, the CPU 51 acquires the accelerator manipulated variable Acc detected by the accelerator sensor 40, the vehicle speed Vs detected by the vehicle speed sensor 41, the shift position SP detected by the shift position sensor 42, and the traveling mode signal Mo of the traveling mode switch 43 vis the input-output interface 53.

Figure 5:
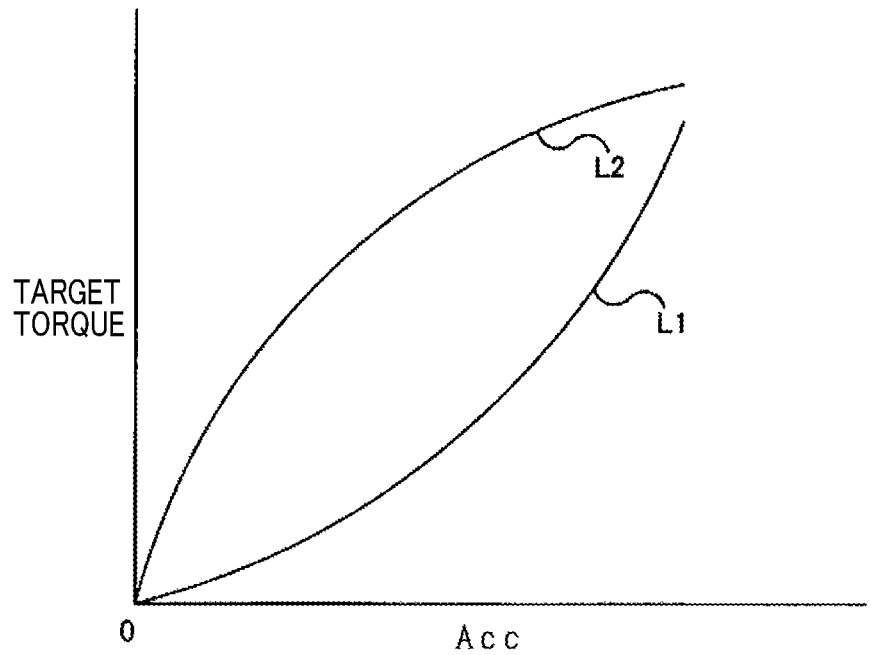
FIG. 5 is a diagram illustrating an example of a target torque map used for calculating target torque.

In step S11, the CPU 51 calculates a target torque based on the acquired accelerator manipulated variable Acc, the vehicle speed Vs, the traveling mode signal Mo, the target torque map M1, and the shift position SP. In the present embodiment, as illustrated in FIG. 5, the target torque map M1 provides a first characteristic line L1 in a case in which the traveling mode is the eco mode and a second characteristic line L2 in a case in which the traveling mode is the sport mode. The first characteristic line L1 and the second characteristic line L2 also depend on the vehicle speed Vs.

The target torque calculated in step S11 is subjected to the gradual change process described above. The target torque Tac that has been subjected to the gradual change process is output to the MG control unit 60 and the monitoring unit 70.

Next, with reference to FIG. 7, a monitoring process performed by the CPU 71 of the monitoring unit 70 will be described. This process is repeatedly performed, for example, at predetermined control cycles during a time period from the start of the control system of the vehicle 10 to the stop of the control system or a time period from the time when the start switch is turned on to the time when the start switch is turned off. The control cycles of the CPU 71 of the monitoring unit 70 and the CPU 51 of the vehicle control unit 50 may be the same or may be different from each other.

In step S20, the CPU 71 acquires the accelerator manipulated variable Acc, the vehicle speed Vs, the shift position SP, and the target torque Tac after the gradual change process via the input-output interface 73.

In step S21, the CPU 71 performs a determination process for determining whether to monitor the vehicle control unit 50. The determination process will be described later in detail.

In step S22, the CPU 71 determines whether the result of the determination process indicates that monitoring will be performed.

Figure 6:
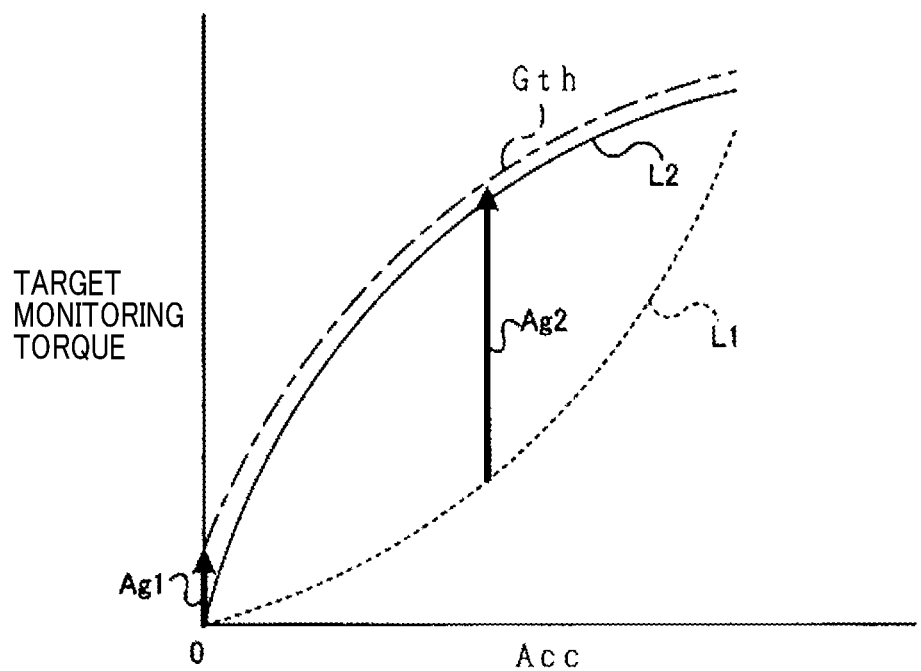
FIG. 6 is a diagram illustrating an example of a target monitoring torque map used for calculating target monitoring torque.

If a positive determination is made in step S22, the process proceeds to step S23 in which the CPU 71 calculates target monitoring torque based on the acquired accelerator manipulated variable Acc, the vehicle speed Vs, the shift position SP, and the monitoring torque map M2. Then, the CPU 71 subjects the calculated target monitoring torque to the gradual change process. As illustrated in FIG. 6, the monitoring torque map M2 provides the second characteristic line L2 corresponding to the sport mode having output characteristics whose output torque is the largest among output characteristics of the rotating electrical machine 20 set depending on the traveling mode, that is, whose output torque corresponding to the accelerator manipulated variable Acc is the largest. In addition, the second characteristic line L2 has characteristics in which a torque difference from the target torque calculated depending on the output characteristics of the mode other than the sport mode is large when the accelerator manipulated variable Acc is more than 0. The reason why the second characteristic line L2 having such output characteristics is used is that the monitoring unit 70 calculates the target monitoring torque without using the traveling mode signal Mo to prevent an abnormality from being erroneously determined when the traveling mode is the sport mode. In FIG. 6, the first characteristic line L1 is indicated by a broken line.

Figure 8:
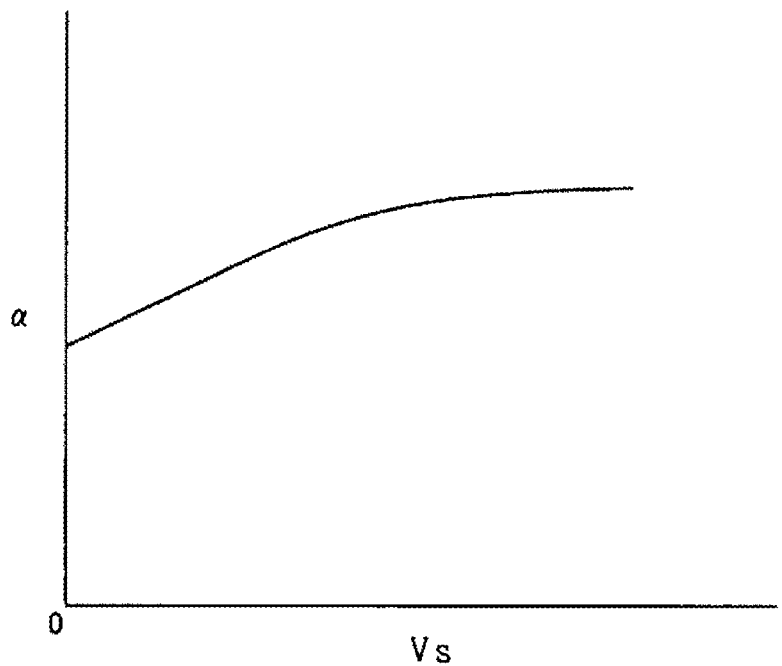
FIG. 8 is a diagram illustrating an example of a map used for calculating a detection threshold value.

In step S24, the CPU 71 sets a detection threshold value α (>0) based on the vehicle speed Vs. The detection threshold value α is for determining whether an abnormality has occurred in the vehicle control unit 50 based on the target torque Tac and the target monitoring torque Taw. In the present embodiment, as illustrated in FIG. 8, as the vehicle speed Vs increases, the detection threshold value α becomes larger.

Figure 9:
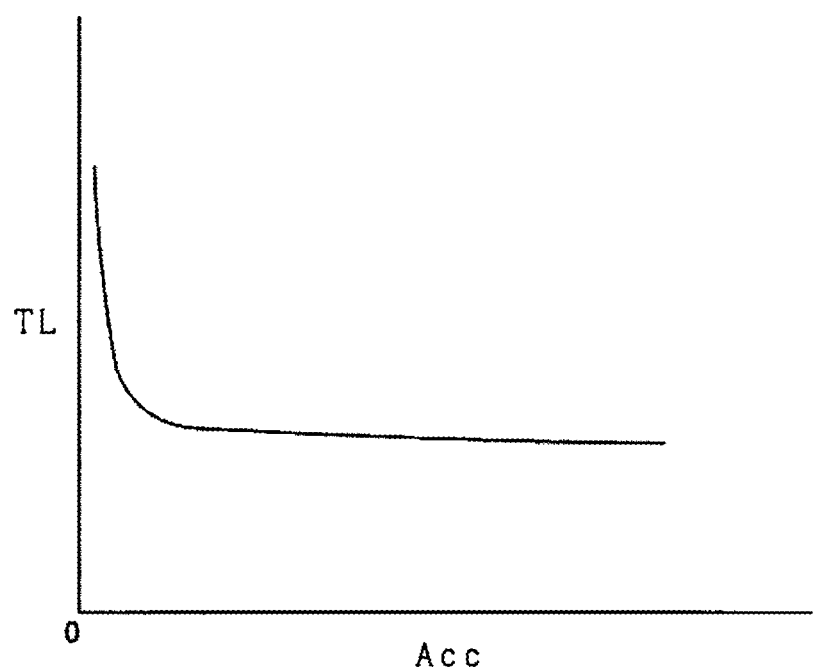
FIG. 9 is a diagram illustrating an example of a map used for calculating a detection time period.

In step S25, the CPU 71 sets a detection time period TL (corresponding to a predetermined time period) based on the accelerator manipulated variable Acc. To suppress increase in vehicle acceleration G to advance decrease in the vehicle acceleration G, in the present embodiment, as illustrated in FIG. 9, as the accelerator manipulated variable Acc increases, the detection time period TL becomes shorter. However, typically, the operating range in which the depressed amount of the accelerator pedal becomes maximum is limited, whereby a so-called half throttle or partial throttle is frequently used. Hence, in the present embodiment, if the accelerator manipulated variable Acc exceeds a predetermined value, the amount of change of the detection time period TL with respect to the amount of change of the accelerator manipulated variable Acc becomes excessively small. In this case, compared with a case in which the accelerator manipulated variable is 0, the detection time period TL becomes short when the accelerator manipulated variable Acc is more than 0.

In step S26, the CPU 71 calculates the absolute value of the difference between the target torque Tac after the gradual change process and the target monitoring torque Taw after the gradual change process and determines whether the calculated absolute value is the detection threshold value α or more. In the present embodiment, the processing in step S26 includes a difference calculation unit. FIG. 6 indicates an upper limit threshold value Gth for determining by the monitoring unit 70 that an abnormality has occurred in the vehicle control unit 50. The upper limit threshold value Gth is obtained by adding the detection threshold value α to each torque value on the second characteristic line L2, that is, target monitoring torque+α, and increases as the accelerator manipulated variable Acc increases. When a positive determination is made in step S26, the target torque is the upper limit threshold value Gth or more.

If it is determined that |Tac−Taw|≥α in step S26, the CPU 71 determines that an abnormality is likely to have occurred in the vehicle control unit 50. Then, the process proceeds to step S27 in which the CPU 71 increments a count value C by one.

In contrast, if it is determined that |Tac−Taw|≤α in step S26, the CPU 71 determines that no abnormalities have occurred in the vehicle control unit 50. Then, the process proceeds to step S28 in which the CPU 71 sets the count value C to 0.

After the processing in step S27 or S28 is completed, the process proceeds to step S29 in which the CPU 71 determines whether the count value C is the detection time period TL or more. If a positive determination is made in step S29, the process proceeds to step S30 in which the CPU 71 outputs the fail-safe signal Sfs to the MG control unit 60. In contrast, if a negative determination is made in step S29, the CPU 71 does not output the fail-safe signal Sfs.

Figure 4:
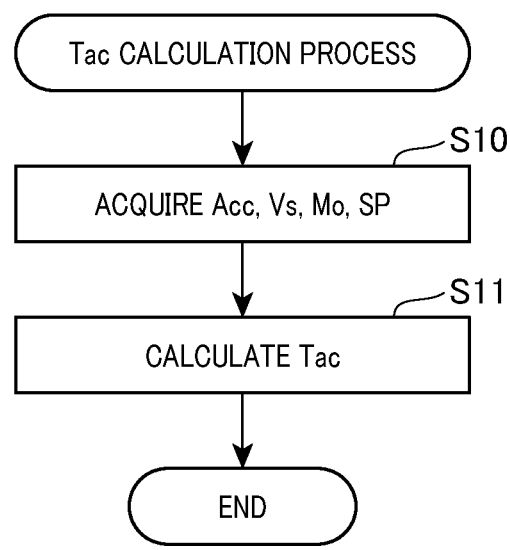
FIG. 4 is a flowchart illustrating a procedure of a target torque calculation process performed by the vehicle control unit.
Figure 7:
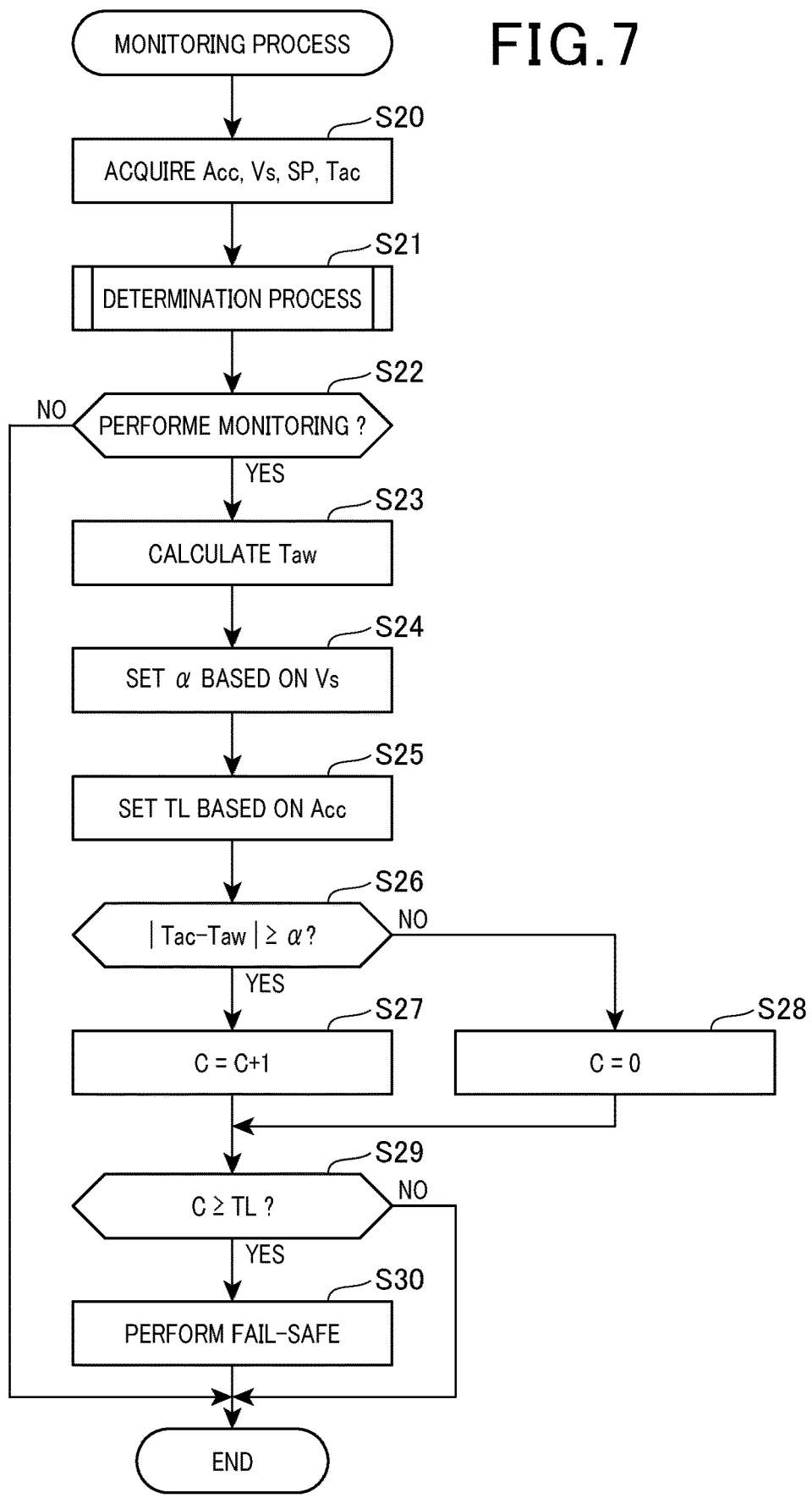
FIG. 7 is a flowchart illustrating a procedure of a monitoring process performed by the monitoring unit.

Examples of changes of the target torque Ta and the vehicle acceleration G in cases in which processes in FIG. 4 and FIG. 7 are performed will be described with reference to FIG. 10 and FIG. 11.

Figure 10:
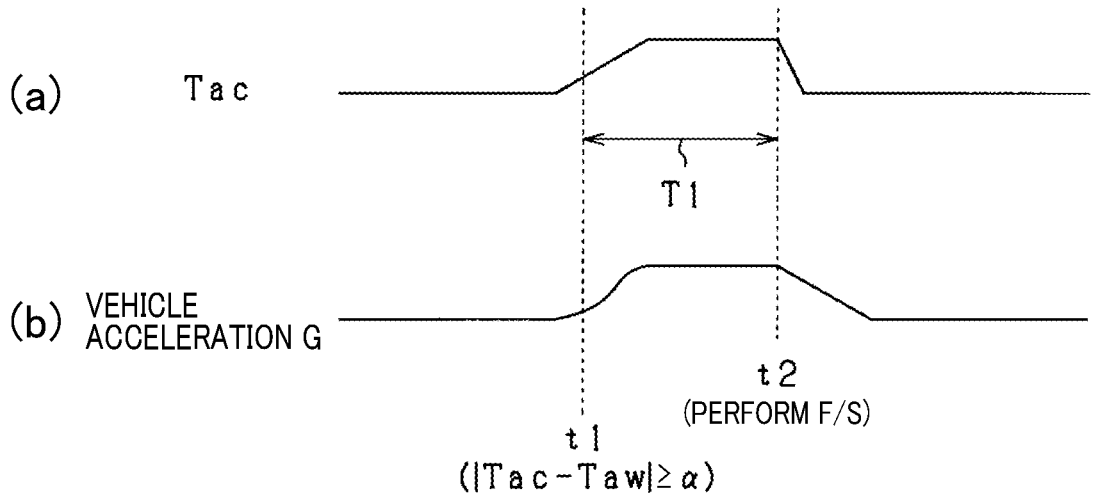
FIG. 10 is a time diagram illustrating changes of target torque and vehicle acceleration in a case in which an accelerator pedal is not depressed.

FIG. 10 illustrates a case in which the vehicle 10 travels forward, and the accelerator manipulated variable Acc is 0. At time t1, the absolute value of the difference between the target torque Tac the target monitoring torque Taw becomes the detection threshold value α or more, whereby counting of the count value C starts. Thereafter, at time t2, by which a first predetermined time period T1 has elapsed, the count value C becomes the detection time period TL or more. As a result, the monitoring unit 70 outputs the fail-safe signal Sfs to the MG control unit 60, whereby the target torque Tac decreases.

When the accelerator manipulated variable Acc is 0, as illustrated in FIG. 6, the difference Ag1 between the target monitoring torque Taw (=0) and the detection threshold value α is small. Hence, the vehicle acceleration G generated in the vehicle 10 until a fail-safe is performed for the rotating electrical machine 20 is relatively low.

Figure 11:
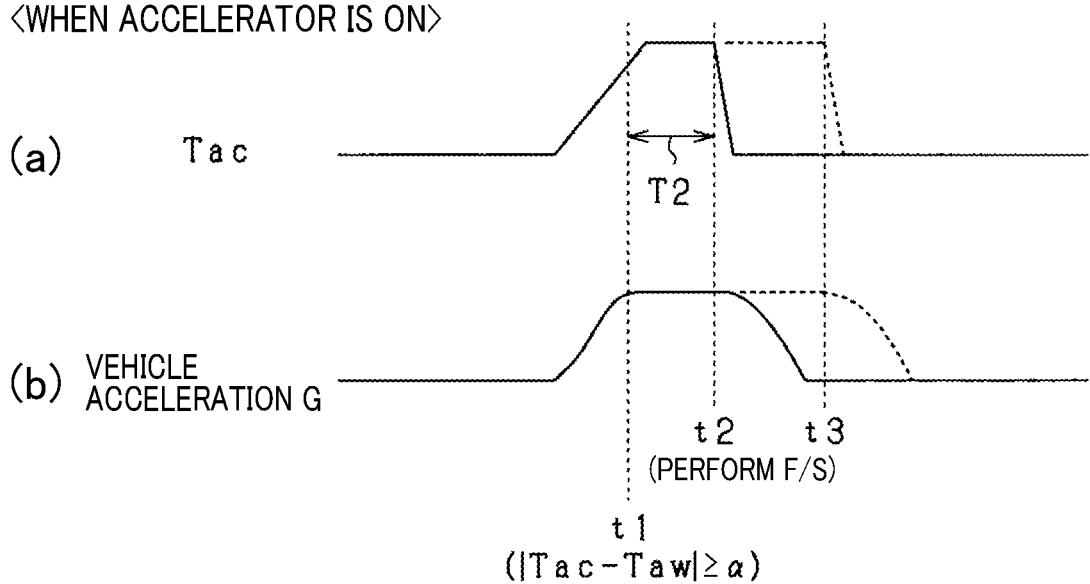
FIG. 11 is a time diagram illustrating changes of target torque and vehicle acceleration in a case in which the accelerator pedal is depressed.

FIG. 11 illustrates a case in which the vehicle 10 travels forward, and the accelerator manipulated variable Acc is more than 0. At time t1, the absolute value of the difference between the target torque Tac the target monitoring torque Taw becomes the detection threshold value α or more, whereby counting of the count value C starts. Thereafter, at time t2, by which a second predetermined time period T2 (<T1) has elapsed, the count value C becomes the detection time period TL or more. As a result, the monitoring unit 70 outputs the fail-safe signal Sfs to the MG control unit 60, whereby the target torque Tac decreases.

When the accelerator manipulated variable Acc is more than 0, and the traveling mode is set to the eco mode, the target torque is calculated according to the first characteristic line L1 indicated by a broken line in FIG. 6. In this case, a torque difference Ag2 between the target torque and the upper limit threshold value Gth is large. Hence, if the target torque more than the upper limit threshold value Gth is calculated due to the occurrence of an abnormality in the vehicle control unit 50, high vehicle acceleration G that is not predicted by the driver is generated in the vehicle 10. Hence, in the present embodiment, the monitoring unit 70 shortens the detection time period T as the accelerator manipulated variable Acc increases. Thus, in the present embodiment, the output timing t2 of the fail-safe signal Sfs can be earlier than the output timing t3 of the fail-safe signal Sfs of a comparative example indicated by a broken line in FIG. 11. As a result, output torque of the rotating electrical machine 20 can be decreased early, whereby the vehicle acceleration G can be decreased early. It is noted that in the comparative example, for example, the detection time period TL is constant regardless of the accelerator manipulated variable Acc.

Even in a case in which no abnormalities have occurred in the vehicle control unit 50, the target torque Tac may be largely displaced from the target monitoring torque Taw. In this case, although the monitoring unit 70 should not output the fail-safe signal Sfs, the fail-safe signal Sfs is output, whereby the output torque of the rotating electrical machine 20 decreases. As a result, there is a concern that drivability of the vehicle may be lowered.

Although the accelerator manipulated variable Acc, the vehicle speed Vs, and the shift position SP, which are redundant signals, and the traveling mode signal Mo, which is a non-redundant signal are used to calculate the target torque, the traveling mode signal Mo is not used to calculate the target monitoring torque. This is a factor by which the target torque Tac may be largely displaced from the target monitoring torque Taw though no abnormalities have occurred in the vehicle control unit 50.

Under the situation in which the target torque crosses 0 and the sign of the target torque Tac change, the target torque Tac is largely displaced from the target monitoring torque Taw easily though no abnormalities have occurred in the vehicle control unit 50. Specifically, since the signal used for calculating the target torque and the signal used for calculating the target monitoring torque differ from each other as described above, the target torque and the target monitoring torque may be displaced from each other. In this case, the change of the target torque Tac after being subjected to the gradual change process differs from the change of the target monitoring torque Taw after being subjected to the gradual change process. As a result, for example, the target torque included in the predetermined torque range including 0 is subjected to the rate process. The target monitoring torque not included in the predetermined torque range is subjected to the smoothing process. In this case, the amount of gradual change of the target torque Tac in the rate process and the amount of gradual change of the target monitoring torque Taw in the smoothing process differ from each other, whereby the target torque Tac is largely displaced from the target monitoring torque Taw.

Figure 12:
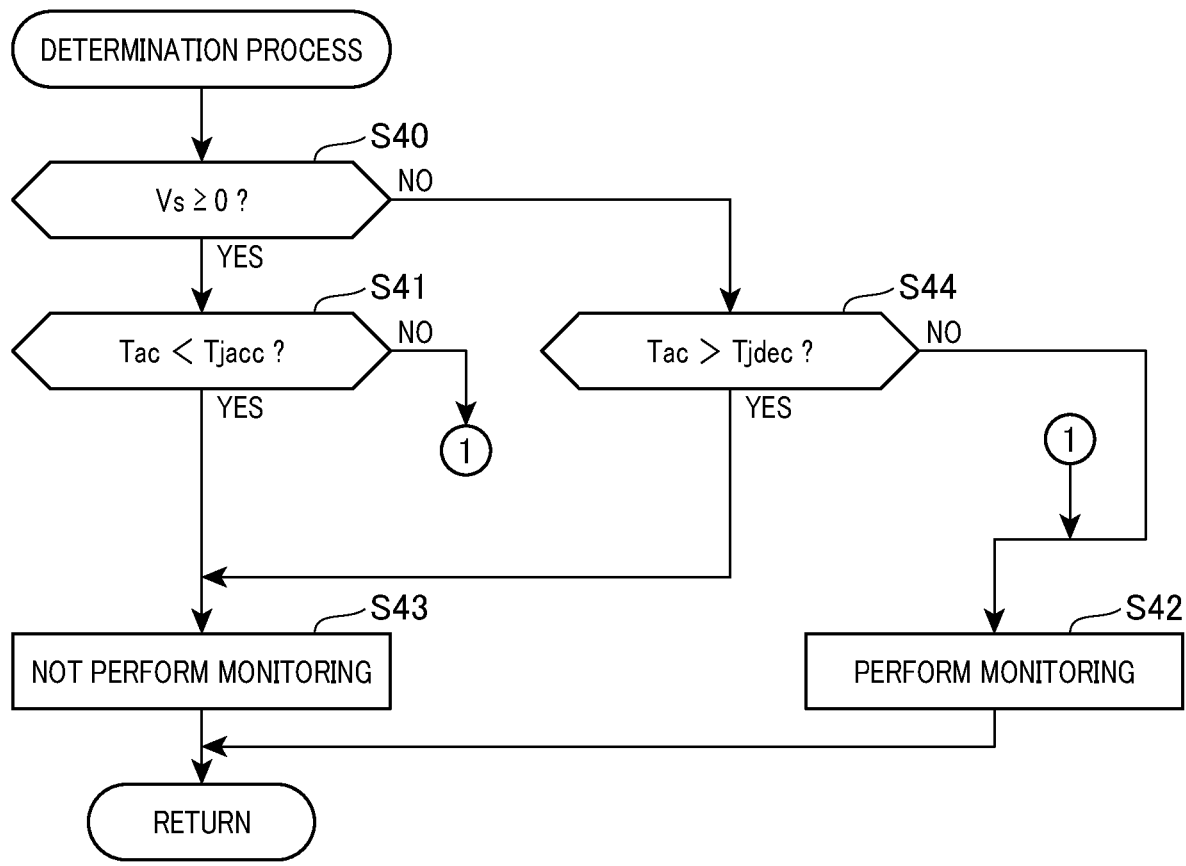
FIG. 12 is a flowchart illustrating a procedure of a determination process performed by the monitoring unit.

Hence, in the present embodiment, the determination process of step S21 in FIG. 7 is performed. FIG. 12 illustrates a procedure of the determination process.

In step S40, the CPU 71 determines whether the vehicle speed Vs is 0 or more.

If a positive determination is made in step S40, the process proceeds to step S41 in which the CPU 71 determines whether the target torque Tac after the gradual change process is less than a first determination value Tjacc (>0). This processing is for determining whether to monitor the vehicle control unit 50. Hereinafter, with reference to FIG. 13, setting the first determination value Tjacc used when the vehicle 10 travels forward will be described.

In the present embodiment, the first determination value Tjacc is set to a value obtained by subtracting a first regeneration torque Tb1 (>0) from a first hazard torque Th1 (>0). The first hazard torque Th1 is an allowable upper limit value of torque of the rotating electrical machine 20 assumed when the vehicle 10 unintentionally accelerates in the forward direction. Specifically, the first hazard torque Th1 is, for example, torque of the rotating electrical machine 20 required for accelerating the vehicle 10 at a predetermined acceleration (e.g., 0.3 times acceleration due to gravity). The first regeneration torque Tb1 is a lower limit value of regeneration torque of the rotating electrical machine 20 which can be generated when the vehicle 10 is decelerated by regenerative drive control while the vehicle 10 travels forward.

The first determination value Tjacc is set to a value smaller than a value G0 of the upper limit threshold value Gth used when the accelerator manipulated variable Acc is 0. Hence, the vehicle control unit 50 can be monitored when the target torque Tac is the upper limit threshold value Gth or less. G0 is the same value as an additional value of the absolute value of the target monitoring torque and the detection threshold value α. The first predetermined torque described above defining the predetermined torque range including 0 is set to, for example, a value smaller than the first determination value Tjacc.

If it is determined that the target torque Tac after the gradual change process is the first determination value Tjacc or more in step S41, the process proceeds to step 42 in which the CPU 71 determines to monitor the vehicle control unit 50.

If it is determined that the target torque Tac after the gradual change process is less than the first determination value Tjacc in step S41, the process proceeds to step 43 in which the CPU 71 determines not to monitor the vehicle control unit 50. After the processing in step S42 or S43 is completed, the process proceeds to step S22 in FIG. 7.

If it is determined that the vehicle speed Vs is less than 0, the CPU 71 determines that the vehicle 10 is traveling backward, and the process proceeds to step S44. In step S44, the CPU 71 determines whether the target torque Tac after the gradual change process is more than a second determination value Tjdec (<0). This processing is for determining whether to monitor the vehicle control unit 50. Hereinafter, with reference to FIG. 14, setting the second determination value Tjdec used when the vehicle 10 travels backward will be described.

In the present embodiment, the second determination value Tjdec is set to a value obtained by subtracting a second hazard torque Th2 (>0) from a second regeneration torque Tb2 (>0). The second hazard torque Th2 is an allowable upper limit value of torque of the rotating electrical machine 20 assumed when the vehicle 10 unintentionally accelerates in the backward direction. The second hazard torque Th2 is a value set from the same viewpoint as that of the first hazard torque Th1. The second regeneration torque Tb2 is a lower limit value of regeneration torque of the rotating electrical machine 20 which can be generated when the vehicle 10 is decelerated by regenerative drive control while the vehicle 10 travels backward.

The absolute value of the second determination value Tjdec is set a value smaller than the value G0 of the upper limit threshold value Gth used when the accelerator manipulated variable Acc is 0. In the present embodiment, the absolute value of the first determination value Tjacc and the absolute value of the second determination value Tjdec are set to the same value. However, other than this setting, the absolute value of the first determination value Tjacc and the absolute value of the second determination value Tjdec may be set to different values. The second predetermined torque described above is set to, for example, a value larger than the second determination value Tjdec.

If it is determined that the target torque Tac after the gradual change process is the second determination value Tjdec or less in step S44, the process proceeds to step 42. In contrast, if it is determined that the target torque Tac after the gradual change process is more than the second determination value Tjdec in step S44, the process proceeds to step 43.

According to the process in FIG. 12 described above, it can be appropriately determined whether an abnormality has occurred in the vehicle control unit 50 while preventing occurrence of a situation in which the fail-safe signal Sfs is output though the monitoring unit 70 should not output the fail-safe signal Sfs.

A signal used for calculating a target torque and a target monitoring torque may be changed depending on requirement specifications of a vehicle. According to the process illustrated in FIG. 12, for example, adjusting the first determination value Tjacc and the second determination value Tjdec can prevent occurrence of a situation in which the fail-safe signal Sfs is output though the monitoring unit 70 should not output the fail-safe signal Sfs. Hence, even in a case in which a signal used for calculating a target torque and a target monitoring torque is changed depending on requirement specifications of a vehicle, the number of work hours needed to design the control device 100 can be reduced.

<Modification of First Embodiment>

In step S40 in FIG. 12, to determine whether the vehicle 10 is traveling forward or backward, instead of the vehicle speed Vs, for example, a rotation speed of the rotor of the rotating electrical machine 20 may be used. The rotational speed of the rotor may be calculated based on, for example, a detection signal of a rotation angle sensor such as a resolver, which detects an electrical angle of the rotating electrical machine 20.

Figure 13:
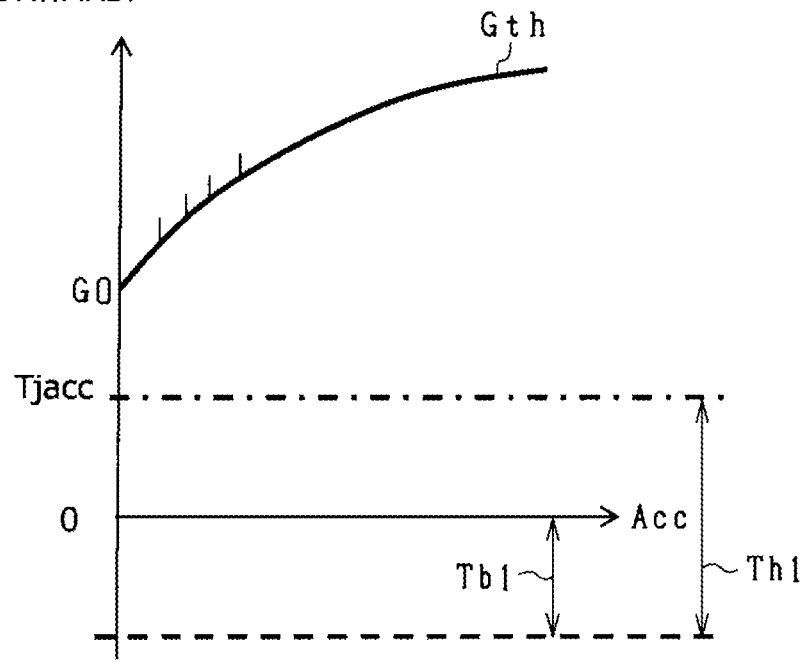
FIG. 13 is a diagram for describing a first determination value used when a vehicle travels forward.

The first determination value Tjacc illustrated in FIG. 13 is not limited to a positive value and may be a negative value. For example, when the first regeneration torque Tb1 is larger than the first hazard torque Th1, the first determination value Tjacc becomes a negative value.

Figure 14:
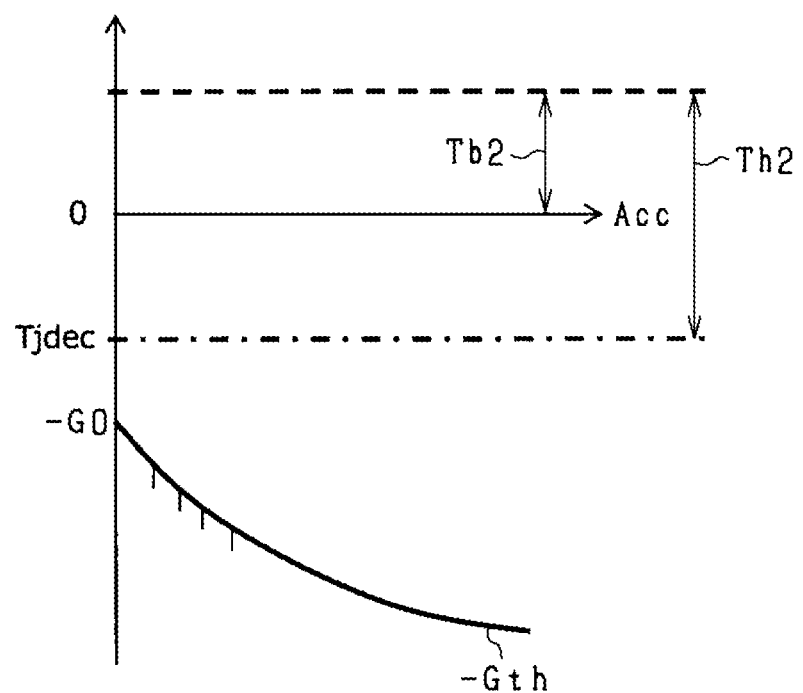
FIG. 14 is a diagram for describing a second determination value used when the vehicle travels backward.

The second determination value Tjdec illustrated in FIG. 14 is not limited to a negative value and may be a positive value. For example, when the second regeneration torque Tb2 is larger than the second hazard torque Th2, the second determination value Tjdec becomes a positive value.

The processing of steps S27 to S29 illustrated in FIG. 7 may be deleted. In this case, if a positive determination is made in step S26, the process may proceed to step S30.

Second Embodiment

Hereinafter, the second embodiment will be described focusing on the difference from the first embodiment, with reference to the drawings. In the present embodiment, the first determination value Tjacc and the second determination value Tjdec can be changed based on a rotation speed Nm of the rotor configuring the rotating electrical machine 20.

Figure 15:
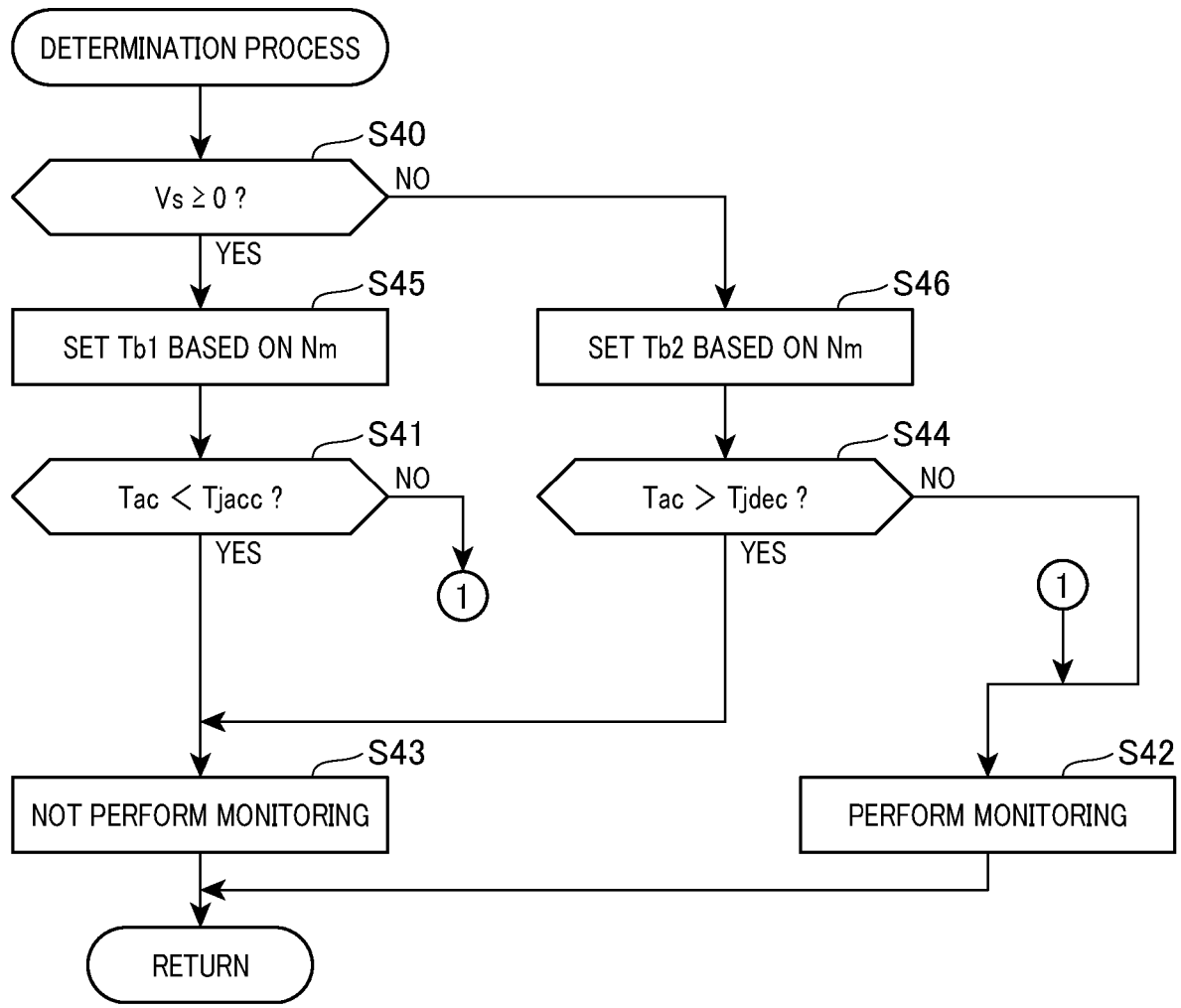
FIG. 15 is a flowchart illustrating a procedure of a determination process performed by the monitoring unit according to a second embodiment.

FIG. 15 illustrates a procedure of a determination process according to the present embodiment. In FIG. 15, the same processing as in that illustrated in FIG. 12 is denoted by the same reference sign for the sake of convenience.

If a positive determination is made in step S40, the process proceeds to step S45 in which the CPU 71 sets the first regeneration torque Tb1 based on the rotation speed Nm of the rotor. This setting considers that the first regeneration torque Tb1 can be changed depending on the rotation speed Nm of the rotor. For example, as the rotation speed Nm of the rotor is higher, the first regeneration torque Tb1 is set to be smaller. The CPU 71 subtracts the set first regeneration torque Tb1 from the first hazard torque Th1 to set the first determination value Tjacc used in step S41. After the processing in step S45 is completed, the process proceeds to step S41. The rotation speed Nm of the rotor may be calculated based on, for example, a detection signal of the rotation angle sensor.

If a negative determination is made in step S40, the process proceeds to step S46 in which the CPU 71 sets the second regeneration torque Tb2 based on the rotation speed Nm of the rotor. For example, as the rotation speed Nm of the rotor is higher, the absolute value of the second regeneration torque Tb2 is set to be smaller. The CPU 71 subtracts the second hazard torque Th2 from the set second regeneration torque Tb2 to set the second determination value Tjdec used in step S44.

According to the present embodiment described above, appropriate determination values Tjacc, Tjdec can be set depending on the rotational speed of the rotor. Hence, the region of the vehicle control unit 50 which is required to be monitored can be determined exactly.

Third Embodiment

Figure 16:
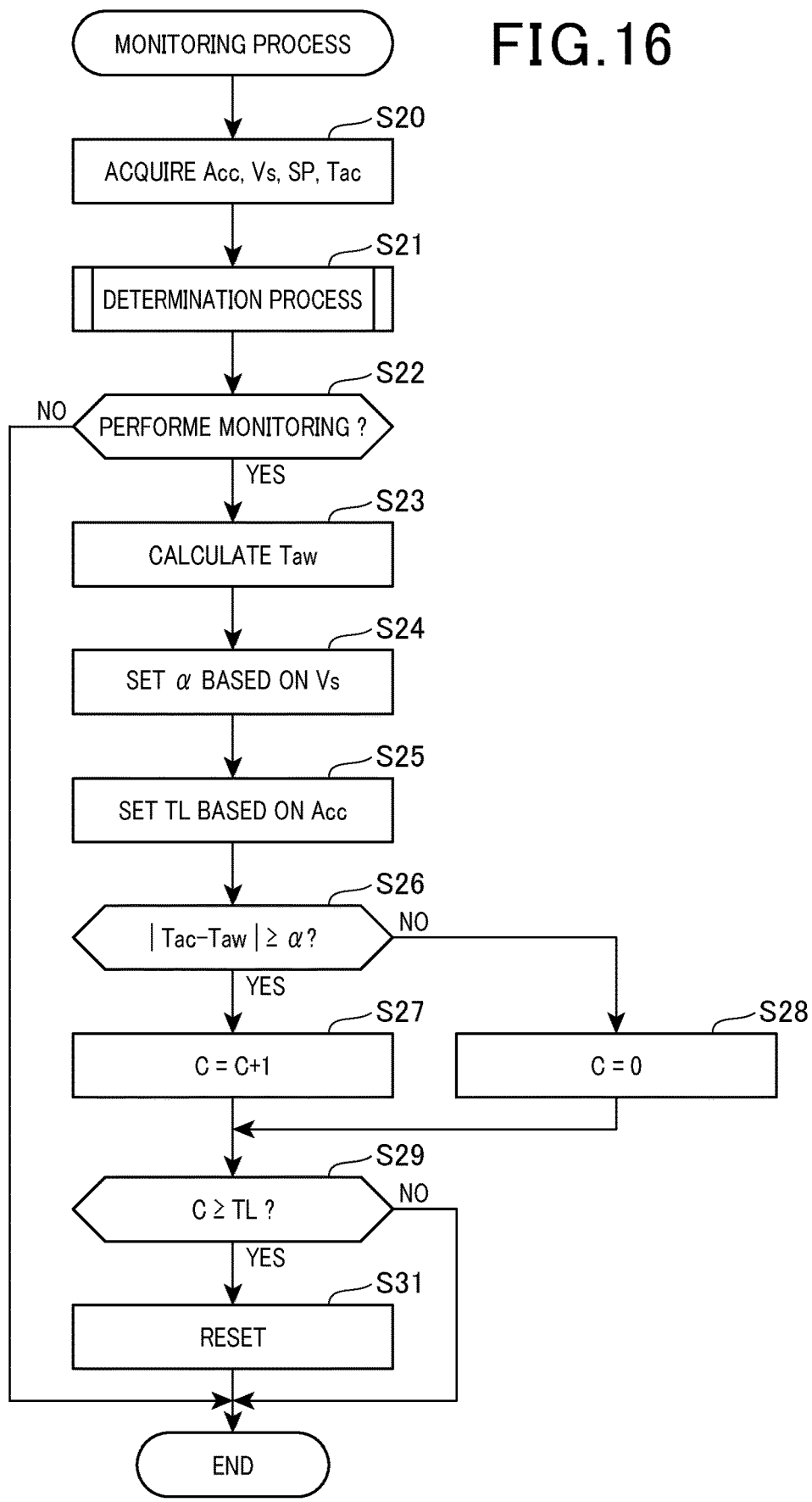
FIG. 16 is a flowchart illustrating a procedure of a monitoring process performed by the monitoring unit according to a third embodiment.

Hereinafter, the third embodiment will be described focusing on the difference from the first embodiment, with reference to the drawings. In the present embodiment, as illustrated in step S31 in FIG. 16, the monitoring unit 70 performs, as the abnormal case process, a process for resetting the control device 100 instead of the fail-safe process. Hence, reliability of the control device 100 can be prevented from being lowered. In FIG. 16, the same processing as in that illustrated in FIG. 7 is denoted by the same reference sign for the sake of convenience.

Other Embodiments

The above embodiments may be modified as below.

As the smoothing process for the target torque and the target monitoring torque, for example, a lowpass filter process may be used. In this case, the degree of smoothing of the smoothing process by the monitoring unit 70 may be the same as the degree of smoothing of the smoothing process by the vehicle control unit 50. When the smoothing process is a lowpass filter process, the degree of smoothing is, for example, a time constant of a lowpass filter.

The smoothing process for the target torque and the target monitoring torque is not limited to the lowpass filter process. The smoothing process may be another process such as a moving average process if respective changes of the target torque and the target monitoring torque can be suppressed.

The target torque and the target monitoring torque may not be subjected to the gradual change process. Even in this case, due to the difference between signals used for calculating the target torque and the target monitoring torque, the fail-safe signal Sfs may be output though no abnormalities have occurred in the vehicle control unit 50. Hence, the present disclosure is effectively applied.

The non-redundant signal is not limited to the traveling mode signal Mo but may be, for example, a 1-pedal mode signal indicating selection of a 1-pedal mode that can perform acceleration and deceleration and braking by depression of the accelerator pedal.

The vehicle control unit 50 may calculate, instead of the target torque [N/m] of the rotating electrical machine 20, target drive force [N] of the rotating electrical machine 20, which is a correlation value of torque of the rotating electrical machine 20. In this case, the monitoring unit 70 may calculate, instead of the target monitoring torque, target monitoring drive force.

The vehicle control unit 50 may calculate, instead of the target torque of the rotating electrical machine 20, target acceleration [m/s^2] applied to the vehicle 10, which is a correlation value of torque of the rotating electrical machine 20. In this case, the monitoring unit 70 may calculate, instead of the target monitoring torque, target monitoring acceleration.

The control device and the method thereof described in the present disclosure may be realized by a dedicated computer provided by configuring a processor and memory programmed to perform one or more functions embodied in a computer program. Alternatively, the control unit and the method thereof described in the present disclosure may be realized by a dedicated computer provided by configuring a processor with one or more dedicated hardware logic circuits. Alternatively, the control unit and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer.

The present disclosure is described according to embodiments; however, it is understood that the present disclosure is not limited to the embodiments and configurations. The present disclosure also includes various modified examples and modifications within an equivalent range. In addition, various combinations and configurations, and other combinations and configurations including more, less, or only a single element, are also within the spirit and scope of the present disclosure.

As an aspect of the present disclosure, a control device (100) for a rotating electrical machine (20) is provided. The control device is applied to a vehicle (10) including the rotating electrical machine capable of transmitting power to a drive wheel (24) and an inverter (30) electrically connected to the rotating electrical machine. The control device includes:

- a target value calculation unit (50) that calculates a target value (Tac) of a controlled variable that is torque of the rotating electrical machine, drive force of the rotating electrical machine, or acceleration of the vehicle, based on a redundant signal and a non-redundant signal;
- an inverter operation unit (60) that operates the inverter to control the controlled variable to the target value;
- a monitoring value calculation unit (70) that calculates a target monitoring value (Taw) of the controlled variable based on the redundant signal; and
- a difference calculation unit (70) that, when the vehicle travels forward, calculates a difference between the target value and the target monitoring value when the target value is a first determination value (Tjacc) or more, and does not calculate the difference when the target value is less than the first determination value, and that, when the vehicle travels rearward, calculates the difference when the target value is a second determination value (Tjdec) or less, and does not calculate the difference when the target value is more than the second determination value.

A target value is calculated based on a redundant signal and a non-redundant signal, whereas a target monitoring value is calculated based on the redundant signal. That is, the non-redundant signal is not used to calculate the target monitoring value. The disclosing person of the present application has found that this is a factor by which the target value may be largely displaced from the target monitoring value though no abnormalities have occurred in the control device whereby the difference between the target value and the target monitoring value may be large.

Hence, according to the present disclosure, when the vehicle travels forward, the difference between the target value and the target monitoring value is not calculated when the target value is less than the first determination value. When the vehicle travels backward, the difference is not calculated when the target value is more than the second determination value. When the difference is not calculated, an abnormal case process based on the difference is not performed. Thus, occurrence of an abnormality in the control device can be appropriately detected while suppressing occurrence of a situation in which an abnormal case process is performed though the abnormal case process should not be performed.

What is claimed is:

1. A control device for a rotating electrical machine, the control device applied to a vehicle including the rotating electrical machine capable of transmitting power to a drive wheel and an inverter electrically connected to the rotating electrical machine, the control device comprising:
    a target value calculation unit that calculates a target value of a controlled variable that is torque of the rotating electrical machine, drive force of the rotating electrical machine, or acceleration of the vehicle, based on a redundant signal and a non-redundant signal;
    an inverter operation unit that operates the inverter to control the controlled variable to the target value;
    a monitoring value calculation unit that calculates a target monitoring value of the controlled variable based on the redundant signal; and
    a difference calculation unit that:
        determines whether the vehicle is traveling forward or rearward;
        determines whether the target value is more than or equal to a positive first determination value when determining that the vehicle is traveling forward;
        calculates a difference between the target value and the target monitoring value when determining that the target value is more than or equal to the positive first determination value;
        does not calculate the difference when determining that the target value is less than the positive first determination value;
        determines whether the target value is less than or equal to a negative second determination value when determining that the vehicle is traveling rearward;
        calculates the difference when determining that the target value is less than or equal to the negative second determination value; and
        does not calculate the difference when determining that the target value is more than the negative second determination value.

2. The control device according to claim 1, wherein
the target value calculation unit subjects the calculated target value to a gradual change process,
the monitoring value calculation unit subjects the calculated target monitoring value to the gradual change process,
the inverter operation unit operates the inverter to control the controlled variable to the target value that has been subjected to the gradual change process,
the difference calculation unit calculates the difference between the target value that has been subjected to the gradual change process and the target monitoring value that has been subjected to the gradual change process when determining that the vehicle is traveling forward and the target value that has been subjected to the gradual change process is more than or equal to the positive first determination value, and does not calculate the difference when determining that the vehicle is traveling forward and the target value that has been subjected to the gradual change process is less than the positive first determination value, and
the difference calculation unit calculates the difference when determining that the vehicle is traveling rearward and the target value that has been subjected to the gradual change process is less than or equal to the negative second determination value, and does not calculate the difference when determining that the vehicle is traveling rearward and the target value that has been subjected to the gradual change process is more than the negative second determination value.

3. The control device according to claim 1, further comprising a processing unit that, when the difference is calculated by the difference calculation unit, performs an abnormal case process on condition that an absolute value of the calculated difference is a threshold value or more.

4. The control device according to claim 3, wherein the processing unit performs the abnormal case process when a state in which the absolute value of the calculated difference is the threshold value or more has continued for a predetermined time period.

5. The control device according to claim 3, wherein
the abnormal case process is a fail-safe process for the rotating electrical machine.
6. The control device according to claim 5, wherein
the fail-safe process is a process for an instruction to lower torque of the rotating electrical machine.
7. The control device according to claim 3, wherein
the abnormal case process is a process for resetting the control device.
8. The control device according to claim 3, wherein
the target value and the target monitoring value become larger as an accelerator manipulated variable by a driver of the vehicle is larger, and
the difference calculation unit is configured to set each of absolute values of the positive first determination value and the negative second determination value to be smaller than an additional value of the target monitoring value and the threshold value when the accelerator manipulated variable is 0.
9. The control device according to claim 1, wherein
the positive first determination value and the negative second determination value are changed based on a rotation speed of the rotor configuring the rotating electrical machine.
10. The control device according to claim 1, wherein
the redundant signal is a signal input to the target value calculation unit from a redundant sensor or from a sensor through a redundant signal line; and
the non-redundant signal is a signal input to the target value calculation unit from a non-redundant sensor or from a sensor through a non-redundant single signal line.
11. The control device according to claim 1, wherein
the redundant signal represents a driver's requested value related to travel of the vehicle;
the non-redundant signal represents one of a plurality of traveling modes of the vehicle, the traveling modes of the vehicle being set based on electricity consumption of the vehicle and output of the vehicle; and
the monitoring value calculation unit calculates the target monitoring value of the controlled variable based on the redundant signal without using the non-redundant signal.
12. The control device according to claim 11, wherein
the redundant signal includes at least one of an accelerator manipulated variable, a speed of the vehicle, and a driver's selected shift position of the vehicle.

* * * * *